United States Patent
Maharana et al.

(10) Patent No.: US 8,806,450 B1
(45) Date of Patent: Aug. 12, 2014

(54) STATIC ANALYSIS IN SELECTIVE SOFTWARE REGRESSION TESTING

(75) Inventors: Srinibas Maharana, Bangalore (IN); Manu J. Prakash, Bangalore (IN); Hong Zeng, Cary, NC (US); Sachin Vasudeva, Fremont, CA (US); Tao Deng, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1466 days.

(21) Appl. No.: 12/146,690

(22) Filed: Jun. 26, 2008

(51) Int. Cl.
*G06F 9/44* (2006.01)

(52) U.S. Cl.
USPC .......................................................... 717/133

(58) Field of Classification Search
USPC .......................................................... 717/131
See application file for complete search history.

(56) References Cited

U.S. PATENT DOCUMENTS

| | | | |
|---|---|---|---|
| 5,673,387 A | 9/1997 | Chen et al. | |
| 5,694,540 A * | 12/1997 | Humelsine et al. | 714/38.1 |
| 5,937,064 A * | 8/1999 | Eick et al. | 713/165 |
| 6,249,882 B1 * | 6/2001 | Testardi | 714/38.14 |
| 7,490,319 B2 * | 2/2009 | Blackwell et al. | 717/124 |
| 2006/0247907 A1 * | 11/2006 | Qadeer et al. | 703/22 |
| 2008/0126867 A1 * | 5/2008 | Pandarinathan et al. | 714/37 |
| 2008/0276228 A1 * | 11/2008 | Sreedhar | 717/131 |
| 2009/0259989 A1 * | 10/2009 | Cifuentes et al. | 717/131 |

OTHER PUBLICATIONS

Ball et al., "The SLAM Project: Debugging System Software via Static Analysis," ACM, 2002, 3pg.*
Harrold et al., "Regression Test Selection for Java Software," ACM, 2001, 15pg.*
Landi et al., "A Safe Approximate Algorithm for Interprocedural Pointer Aliasing," ACM, 1992, 14pg.*
Rothermel et al., "Analyzing Regression Test Selection Techniques," IEEE, 1996, 24pg.*

* cited by examiner

*Primary Examiner* — Ryan Coyer
(74) *Attorney, Agent, or Firm* — Harrity & Harrity, LLP

(57) ABSTRACT

Static analysis of software code may be performed in a selective regression testing framework. The static impact analysis, when carried out in a comprehensive and efficient way, can help make the test selection safer and more complete. One method for performing static analysis in selective regression testing of a software project includes, for example, storing changes to source code that defines functions and global data elements of the software project; performing a static analysis of the source code to determine which global data elements in the source code correspond to changed functions in the source code and executing a regression test of the software project using a set of test units determined based, at least in part, on the static analysis.

20 Claims, 11 Drawing Sheets

STATIC ANALYSIS IN SELECTIVE SOFTWARE REGRESSION TESTING

BACKGROUND OF THE INVENTION

A. Field of the Invention

Concepts described herein relate generally to the selective regression testing of software, and more specifically, to a static analysis process within the framework of selective regression testing.

B. Description of Related Art

Software regression testing refers to software testing that seeks to uncover regression bugs (i.e., errors) in successive versions of software. Regression bugs occur when software functionality that worked as desired in previous versions of a software product stops working or no longer works in the intended way. Typically regression bugs occur as an unintended consequence of program changes.

As more and more features are added to a software system, performing regression testing can become more expensive in terms of both human and computing resources needed to perform and monitor a regression testing cycle. For example, in some relatively complex software systems, a regression cycle may require in excess of 500 hours of computation time to test a particular version of software.

A test suite typically includes a number of test units, each of which covers some subset of the entities of the software system under test. A full regression test refers to the process of running the entire test suite regardless of what entities of the software system are changed from a previous version. It is the safest yet the most expensive approach to regression testing.

As opposed to a full regression test, a selective regression test runs a subset of the test suite, by only selecting test units whose covered entities have been changed from a previous version of the software, or fall within the changed (impacted) scope of some other changed software entities. If none of the software entities covered by a test unit is changed or impacted, it is considered safe not to run this test unit in the regression test. Since changes between two consecutive versions of a large software system are typically small compared to the whole software body, a selective regression test properly carried out can significantly reduce the required resources and lower the testing cost without impacting on the testing safety criteria.

The cost-saving advantage of a selective regression test over a full regression test comes at a price of a more complex analysis that is needed to be conducted on the software system (i.e., static analysis), the test suite (i.e., dynamic analysis) and the test unit selection algorithm (i.e., test case selection analysis). All three of these building-block processes may be equally important and can be closely integrated in order to achieve the ultimate goal of defining a precise, safe, and selective test unit set based on the software entity changes.

Static analysis of the software system under test may be done to determine an impact analysis of arbitrarily changed software entities. When a changed software entity is detected, it may be important to find out what other software entities may be affected by the given change and the software system. Based on the output of the static analysis, the test case selection analysis could ideally choose an optimal set of test units without compromising the safety of the selective regression testing.

SUMMARY

One aspect is directed to a method for performing static analysis in the selective regression testing of a software project. The method includes storing changes to source code that defines functions and global data elements of the software project; performing a static analysis of the source code to determine which global data elements in the source code correspond to changed functions in the source code; and executing a regression test of the software project using a set of test units determined based, at least in part, on the static analysis.

Another aspect is directed to a method for performing static analysis in a selective regression test of a software project. The method includes storing changes to source code that defines functions and global data elements of the software project, the source code implementing a uniform naming scheme for the global data elements, the global variable types being named using predetermined expressions. The method further includes performing a static analysis of the source code to determine which global data elements in the source code correspond to a changed function in the source code, the static analysis including determining an impacted scope for the changed function as functions that are directly or indirectly called by the changed function and functions that call the changed function and that receive a return value.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Selective regression testing can be a 3-module process. The first module is dynamic analysis, which is conducted to instrument the source code, and obtain a mapping, via run-time trace logs, between test units in the test suite and corresponding covered software entities. Dynamic analysis may also identify changed software entities from a change-tracing database of the source code, and provide them as an input to the second module—static analysis. Static analysis may take the changed software entities from source code version control logic 125 (or from another source) as input along with the software system source code functional expression information from a modified compiler front-end module to analyze the software system and determine the scope of the impact (i.e., "impact scope") of these changed software entities. The impact scope, which essentially is a larger set of software entities, may then be provided to the third module—test case selection analysis. Test case selection analysis combines the results from both the dynamic analysis and the static analysis, utilizes intelligent test unit selection algorithm(s), and may eventually output a subset of the full test suite for a selective regression test.

Techniques described herein relate to the static analysis process. Techniques for performing static analysis in selective regression testing on a software system are described herein in which global data element usage information is efficiently determined and mapped to functions of the software system. By accurately determining the impacted scope for functions changed in the software system and by determining global data element usage information, the safety of a regression test can be guaranteed when using a selected subset of the full test suite.

System Description

Figure 1:
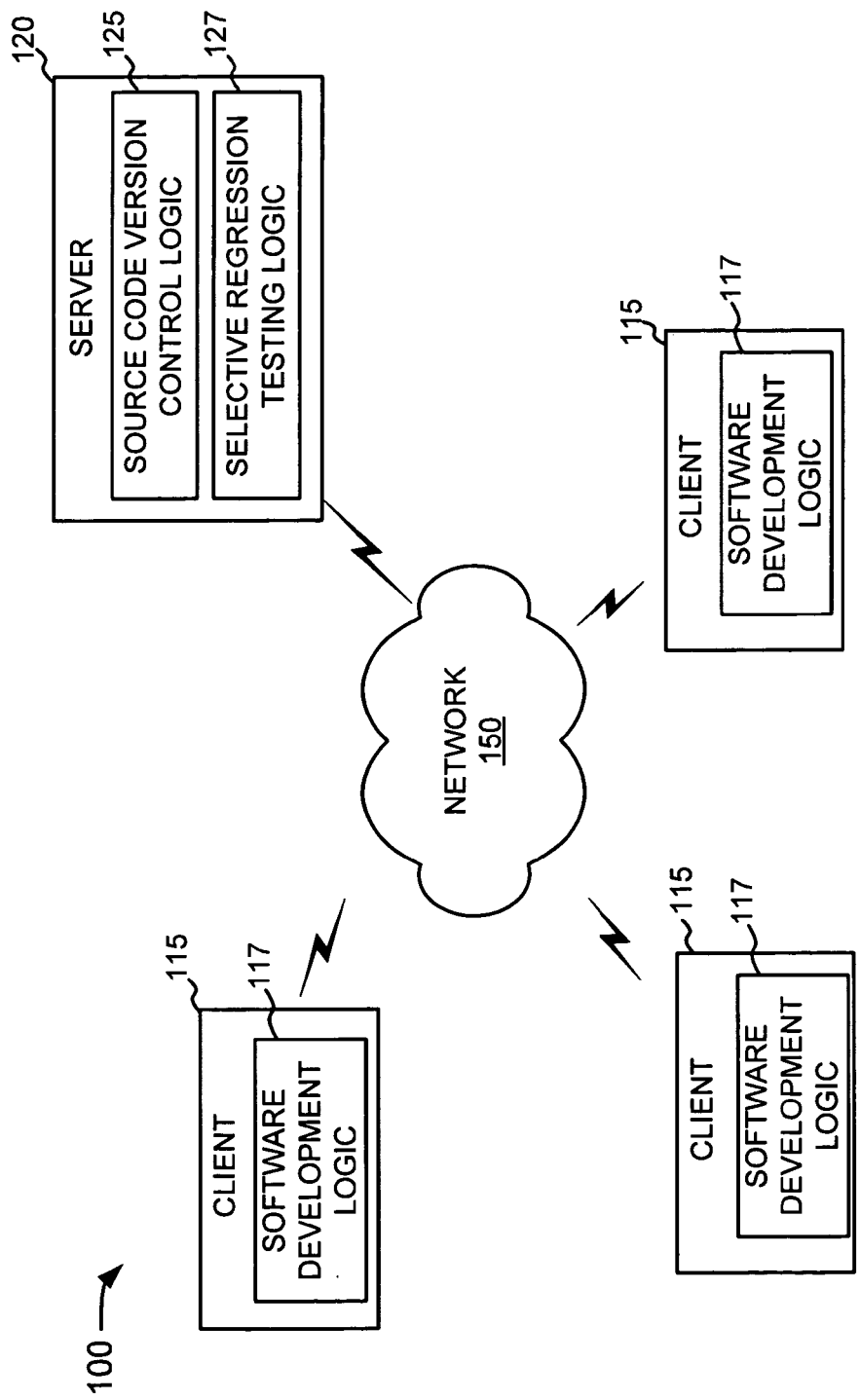
FIG. 1 is a diagram of an exemplary software development system in which concepts consistent with the principles of the invention may be implemented.

FIG. 1 is a diagram of an exemplary software development system 100 in which concepts consistent with the principles of the invention may be implemented. System 100 may include multiple clients 115 that can connect to a server 120 via a network 150. Server 120 may generally provide services related to software design.

Server 120 may be a computing device and may include source code version control logic 125 and selective regression testing logic 127. Source code version control logic 125 may operate to keep track of work on and/or changes to a software project, such as by keeping track of changes to files that define the software project. Selective regression testing logic 127 may generally operate to perform software regression testing on the software project. For example, before a new version of a software project is released to a customer, an administrator may selective regression testing logic 127 to perform regression testing on the software product.

Each of clients 115 may include a device, such as a personal computer, a wireless telephone, a personal digital assistant (PDA), a lap top, or another type of computation or communication device. In general, users of clients 115 may include software developers working on a software project. Clients 115 may include software development logic 117 to assist the users of clients 115 in working on the software project. Software development logic 117 may include, for example, compilers, integrated development environments (IDEs), and/or other programs used in software development. Users of clients 115 may access or receive information from server 120 via network 150. For example, clients 115 may receive source code from and transmit source code to server 120.

Network 150 may include a local area network (LAN), a wide area network (WAN), a telephone network, such as the Public Switched Telephone Network (PSTN), an intranet, the Internet, or a combination of networks. Three clients 115 and one server 120 are illustrated as connected to network 150 for simplicity. In practice, system 100 may include fewer or more clients and/or servers. Also, in some instances, a client may perform one or more functions of a server and a server may perform one or more functions of a client.

Although software development system 100 is shown in FIG. 1 using a client-server networked system, other system designs could alternatively be used. For example, source code version control logic 125, regression testing logic 127, and software development logic 117 may all be implemented by and used on a single computing device in a non-networked implementation. Additionally, although source code version control logic 125 and regression testing logic 127 are shown as being implemented within a single server 120, it can be appreciated that source code version control logic 125 and regression testing logic 127 could be implemented on separate devices.

Figure 2:
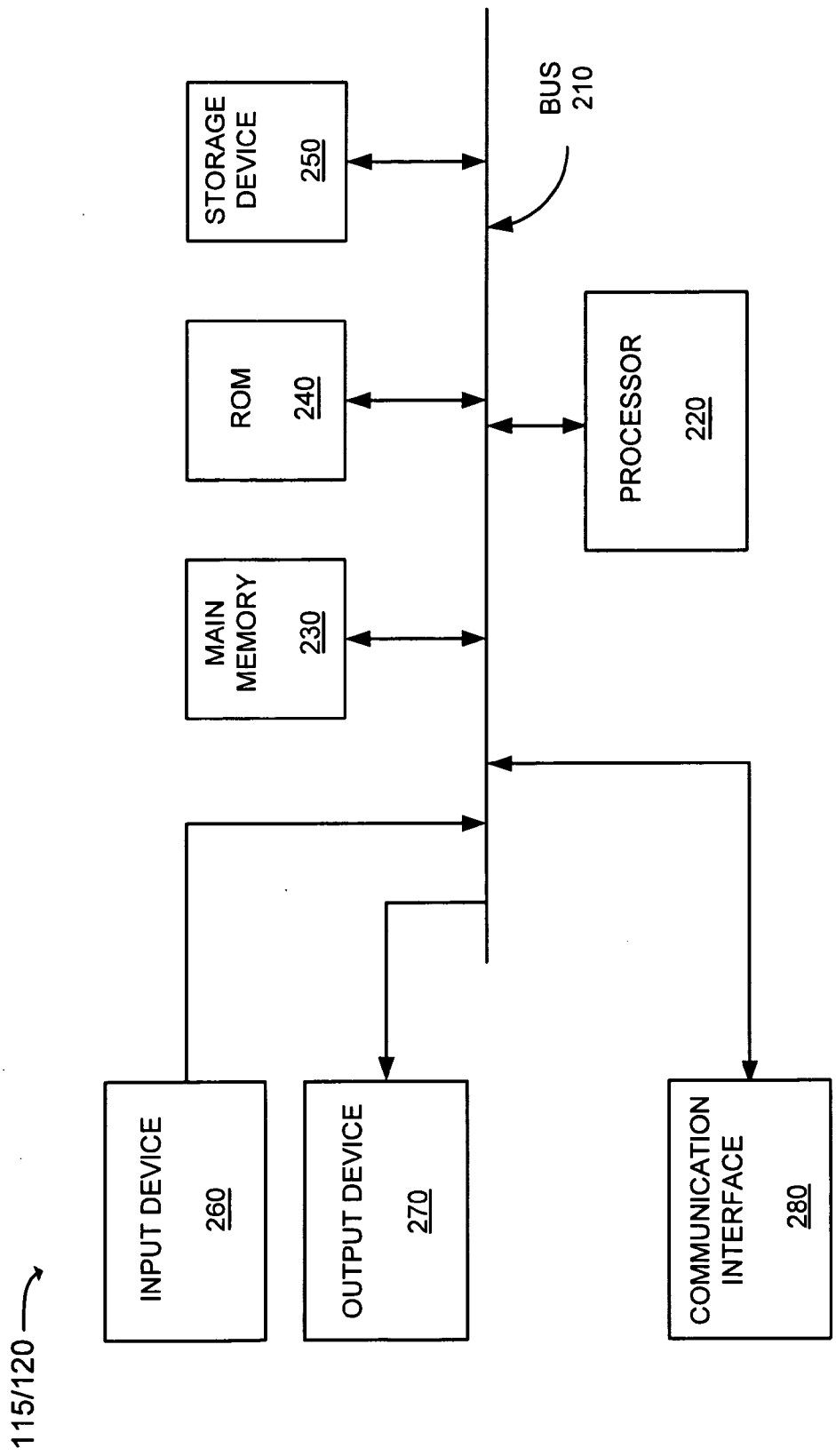
FIG. 2 is a block diagram of an exemplary device shown in FIG. 1.

FIG. 2 is an exemplary diagram of a computing device 115/120, such as one of clients 115 or server 120, as shown in FIG. 1. Computing device 115/120 may include a bus 210, a processor 220, a main memory 230, a read only memory (ROM) 240, a storage device 250, an input device 260, an output device 270, and a communication interface 280. Bus 210 may include a path that permits communication among the components of computing device 115/120.

Processor 220 may include any type of processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits a user to input information to computing device 115/120, such as a keyboard, a mouse, a pen, voice recognition and/or biometric mechanisms, etc. Output device 270 may include a mechanism that outputs information to the user, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 150.

Source code version control logic 125, selective regression testing logic 127, and/or software development logic 117 may be implemented in software and stored in a computer-readable medium, such as memory 230. A computer-readable medium may be defined as one or more physical or logical memory devices and/or carrier waves. The software instructions contained in memory 230 cause processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Static Analysis Overview

Selective regression testing logic 127 may have access to a full suite of test units that are designed to uncover software bugs. Each "test unit" may be a script or other logic designed to test interact with the software project to uncover software bugs. These bugs typically occur as software functionality that previously worked as desired stops working or no longer works in the anticipated way. Typically software bugs found in regression testing occur as an unintended consequence of program changes during the software maintenance cycle. A goal of conducting static analysis in a selective regression test is to identify the impact (change) scope of the changed software entities, i.e., what software entities may be impacted, and to what degree, by the detected program changes from the previous version of the software system.

As described herein, a global data element can be defined as a data structure variable with a persistent memory location, which is accessible for the whole software process or system, directly or indirectly through aliasing. The global data elements may also include dynamic data elements allocated from the heap space, which are not persistent through out the life of the system, but are visible through aliasing for the whole system, and have global behavior impact for the software system.

Figure 3A:
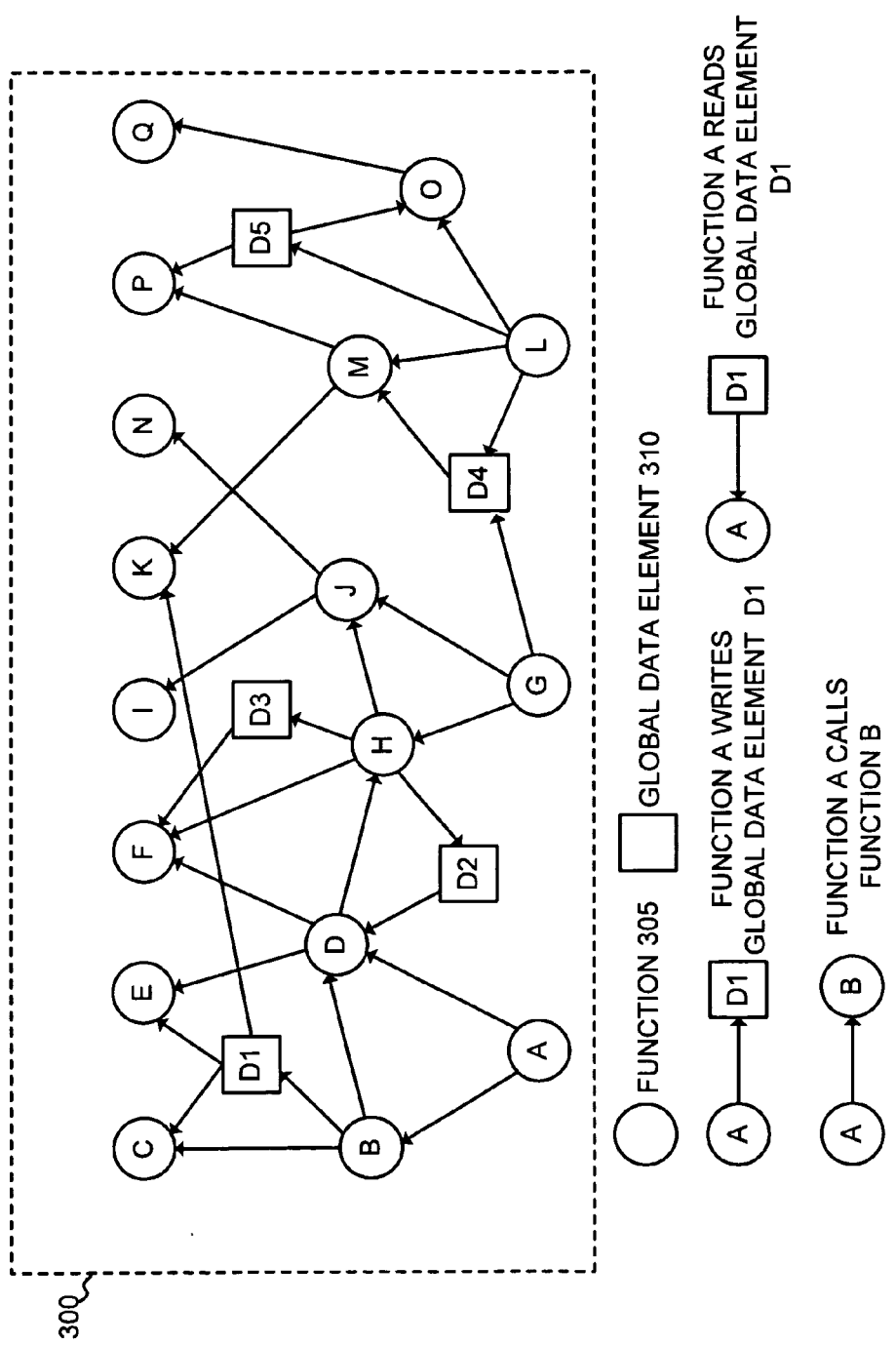
FIGS. 3A and 3B are diagrams that conceptually illustrate the associations among software entities defined in a software system.
Figure 3B:
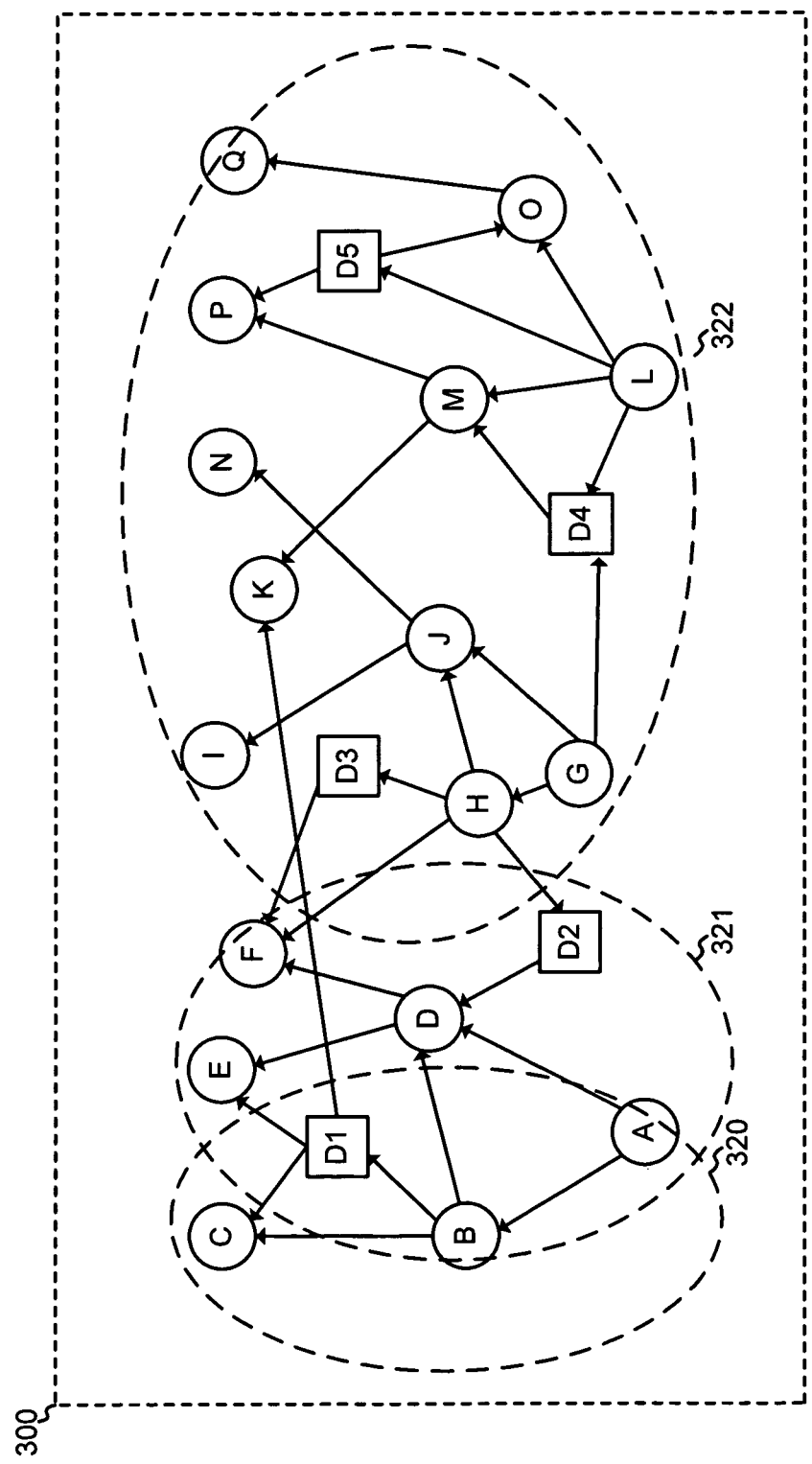

FIGS. 3A and 3B are diagrams that conceptually illustrate the associations among software entities defined in a software system. Assume a software system 300 is represented by a number of functions 305, shown as circles labeled A through Q, and global data elements 310 (e.g., global variables), shown as rectangles labeled as D1 through D5. Functions 305 may be defined as a discrete unit of software code within software system 300 and may include software procedures, subroutines, functions, or other units of software source code. Global data elements 310 may be defined as any piece of data that exists outside of a function.

Arrows in FIG. 3A represent dependency relationships. As shown in FIG. 3A, an arrow pointing from a first function to a second function represents that the first function calls the second function. In other words, the first function depends on the second function and changes in the first function may impact the behavior of the second function. If the first function uses the return value of the called second function, a change in the second function may have an impact on the behavior of the first function. An arrow pointing from a function to a global data element represents that the function writes (e.g., modifies) the global data element. An arrow pointing from a global data element to a function represents that the function reads the global data element. Here, any change in a function which modifies a global data element may have an impact on the behavior of the functions which use the global data element. Further, any global data elements modified in the impacted scope of a changed function may have an impact on the behavior of the functions which use these global data elements.

Before static analysis, each test unit may have its test coverage obtained on the software system via a dynamic analysis module. FIG. 3B illustrates different coverage scope for three different test units on software system 300. As shown in FIG. 3B, three test units 320 through 322 are illustrated. Test unit 320 covers functions A, B, and C, and global data element D1. Test unit 321 covers functions A, B, D, E and F and global data elements D1 and D2. Test unit 322 covers functions G, H, I, J, K, L, M, N, 0, P, and Q and global data elements D3, D4 and D5.

The importance of conducting static analysis to obtain the impact scope of changed code and global data usage information can be appreciated in the following example. Suppose that in software system 300, function B, which is covered by test units 320 and 321, is changed in a release. Without static impact analysis, the test unit analysis module may either choose test unit 320 or 321 as being relevant to a selective regression test, or both, as all it knows is a changed function B. However, static analysis may show that function B writes to global data element D1, which may be read by function K. Hence, function K falls in the impacted scope of the changed function B with a 2-level association degree. As a result, the test unit selecting module may create a test unit 322 in the test set to be tested along with the test units 320 and 321. New test unit 322 covers function B as well as function K.

The previous example assumed a simplified test selection scheme, whereas the actual test unit selecting analysis may be a far more complex process that may incorporate factors including the safety threshold, the total number of test units, and the degree of impact.

Figure 4:
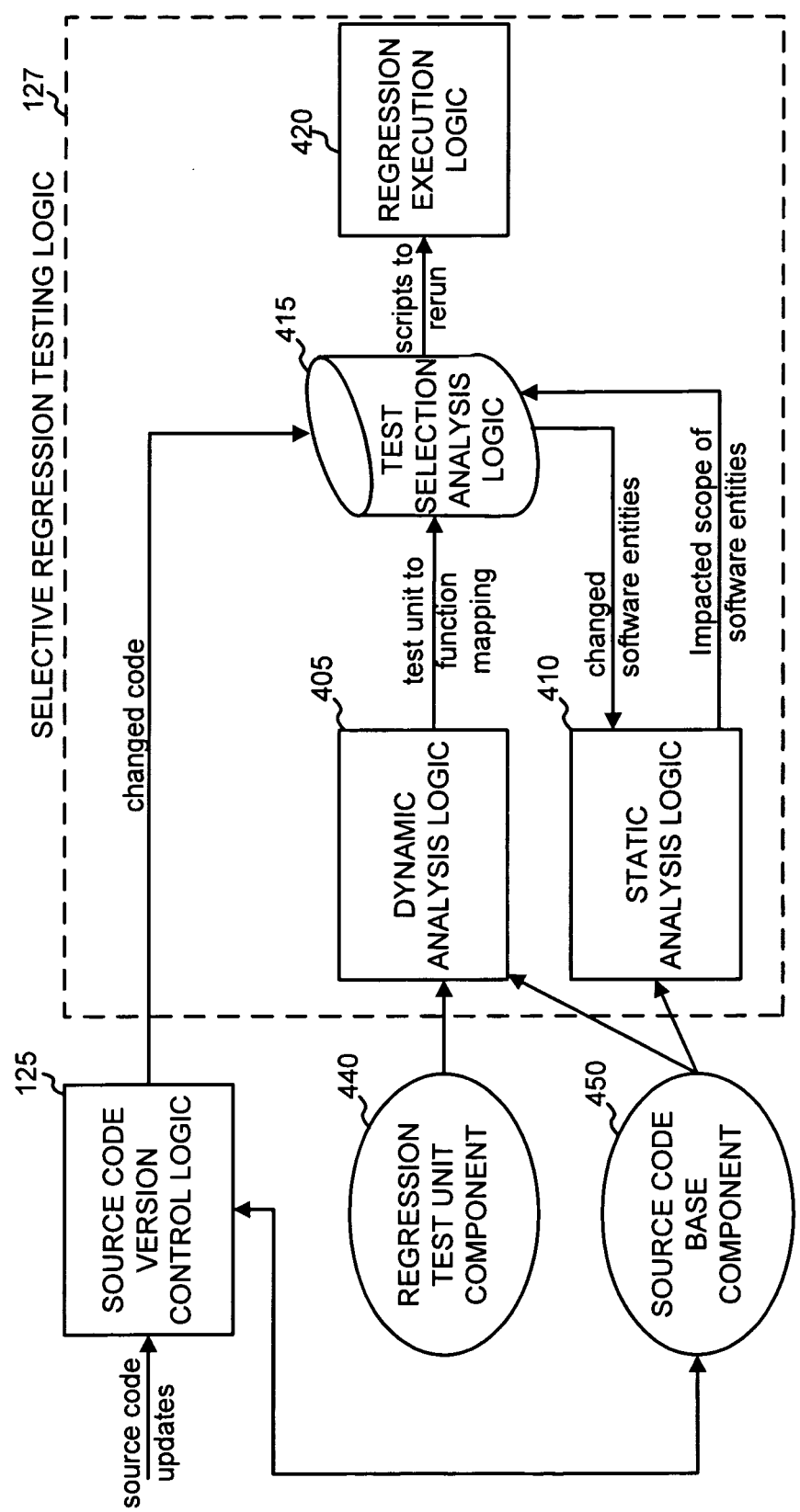
FIG. 4 is a block diagram illustrating an exemplary architecture for selective regression testing.

FIG. 4 is a block diagram illustrating the overall process of selective regression testing. As shown in FIG. 4, source code version control logic 125 operates on source code stored in source code base component 450, and selective regression testing logic 127 operates on a full suite of test units stored in regression test unit component 440.

As previously mentioned, source code version control logic 125 keeps track of versions of source code for the software project. For example, developers (e.g., users of clients 115) may connect to source code version control logic 125 in order to "check-out" a complete copy of the project, work on this copy and then later "check-in" the revised copy. Source code version control logic 125 may allow several developers to work on the same project concurrently, each one editing files within a working copy of the project, and checking-in modifications to the source code version control logic 125. In some implementations, to avoid the possibility of conflicts in edits to a file in a software project, source code version control logic 125 may only accept changes made to the most recent version of a file. Source code version control logic 125 may write the modified source code received from developers to source code base component 450.

Selective regression testing logic 127 may include dynamic analysis logic 405, static analysis logic 410, test selection analysis logic 415, and regression execution logic 420. In general, dynamic analysis logic 405, static analysis logic 410, and test selection analysis logic 415 operate to determine which test units within the full test suite are to be included in a selective regression test. Regression execution logic 420 may perform the actual regression test based on the test units that are selected.

Dynamic analysis logic 405 may operate to instrument the source code of the software system and obtain the coverage information for the test units in the full test suite. Dynamic analysis logic 405 may perform a dynamic analysis of the code and obtain a mapping indicating which test units in the test suite correspond to which portions of the software project.

Static analysis logic 410 may take, as input, the source code changes detected through software version control logic 125 along with an abstract functional expression for the software system to determine the global data usage information. Based on this analysis, static analysis logic 410 may generate the impact scope of the changed code and global data usage information, and supply the results to test selection analysis logic 415 for determining the final set of test units.

Test selection analysis logic 415 may receive the test unit to function mappings from dynamic analysis logic 405 and the impacted software entities determined by static analysis logic 410. Based on this information, test selection analysis logic 415 may determine the final set of test units to use in a selective regression test.

Regression execution logic 420 may operate on the final set of test units to perform selective regression testing of the software. Thus, regression execution logic 420 may perform the actual regression test based on the final set of test units.

Figure 5:
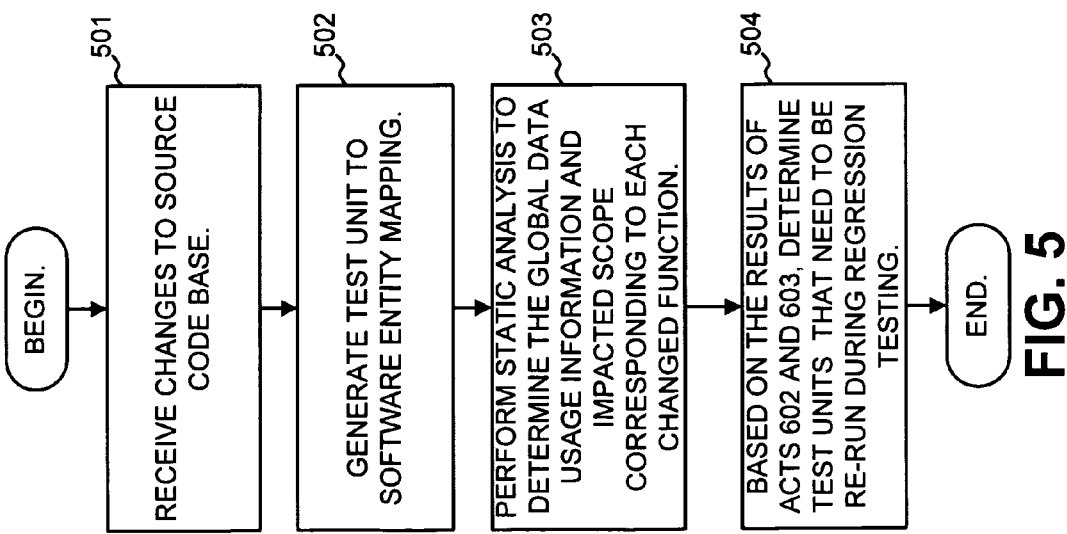
FIG. 5 is a flow chart illustrating exemplary operations for generating the final set of test units that are to be re-run during selective regression testing.

FIG. 5 is a flow chart illustrating exemplary operations for generating the final set of test units that are to be re-run during regression testing by regression execution logic 420.

Changes to the source code base component 450 are received from source code version control logic 125 when changes are checked in by developers (act 501). A uniform naming scheme may be enforced for global data elements definitions. For example, the uniform naming scheme may be manually imposed on the developers and/or it may be automatically verified by source code version control logic 125, which can uniquely identify the global data elements. The naming scheme may be implemented so that select global variable types are named using predetermined expressions. By naming the variables using a predetermined scheme, selective regression testing logic 127 can recognize the type of a global data element based on the name of the global data element. Alternatively, source code version control logic 125 or static analysis logic 410 may tag the file scope static and function scope static variables in some predetermined manner to uniquely identify these variables in the source code base. Also, run-time dynamically allocated global memory data elements out of heap space can be named with unique tags by static analysis logic 410.

As an example of one exemplary naming scheme, global variables that are declared as file static variables may be given a name of the form "filename_name," where "filename" is the name of the file in which the file static variable is declared and "name" is an arbitrary name for the variable. Similarly, global variables that are declared as function static variables may be given a name of the form "funcname_name," where "funcname" is the name of the function in which the function static variable is declared and "name" is an arbitrary name for the variable. Further, dynamically allocated global variables may be given a name of the form "funcname_allocfuncname_idx," where "funcname" is the function in which the function static variable is declared and "idx" is an index identifying the particular dynamic allocation within the function. It can be appreciated that the naming scheme can be used to indicate additional information about each global data element, such as whether a global data element is a pointer, a function pointer, an array element, a subfield, or the offset of a subfield in a structure, along with variable type information for the global data element. This additional information and functional expression outputs may be obtained through an enhanced compiler front-end module. Static analysis logic 410 may use a predefined or supplied method to determine the dynamic memory allocations functions for a software system, and to identify and tag dynamically allocated global variables appropriately at their call sites.

Dynamic analysis logic 405 may operate to obtain a mapping between the test units and the software entities (act 502). As previously mentioned, dynamic analysis logic 405 may instrument the source code and obtain a mapping between test units in the test suite and the software entities via run-time trace logs. Techniques for performing dynamic analysis of software are known in the art and will not be described further herein.

Static analysis logic 410 may perform the previously mentioned static analysis to determine global data usage information and the impacted scope corresponding to each changed function (act 503). That is, static analysis logic 410 may determine, based on the changed code information produced by source code version control logic 125 and stored in database 415, each function impacted in the latest version of the software project and which global data elements are used in the impacted scope. The operation of static analysis logic 410 in performing act 503 will be described in more detail below.

Based on the script to function mappings (act 502) and the output of act 503, the set of test units that need to be re-run for the regression test may be determined (act 504). Ideally, the test units to be re-run should define a minimal set of test units that will safely and completely test the changes made in the version of the software project under test.

Using the test units determined in act 504, regression execution logic 420 may perform the regression test. Techniques for performing a regression test based on a set of test units defined by scripts are known in the art and thus regression execution logic 420 will not be described in additional detail herein.

Static Analysis Logic 410

In this section, a detailed description for conducting static analysis is given. As mentioned, static analysis logic 410 may determine global data usage information and the impacted scope corresponding to the changed functions (act 503). Through this determination, the impact of a change in the source code can be more precisely identified.

Static analysis logic 410 may input change function information from source code versioning logic 125 and the abstract functional expression information output through an enhanced compiler front-end module. Additionally, the compiler front-end module may generate additional marker information for each functional expression, such as the variable name, the variable type information, variable scope information, the variable aggregation information (whether it's an array, a pointer variable, a structure offset field, the offset of the subfield from the base of the structure element etc), the operation performed for the data, and functional elements.

The functional expression transformation or the operations performed in a software system on software entities may be categorized as, (1) assignment, (2) function call, (3) function argument, (4) return operation from a function, and (5) various other arithmetic operations. These operations performed on the software entities in a software system encompass the functional behavior and dependency logic of the software system functionality. The compiler front-end module may generate this information for the software system to act as input to static analysis logic 410 for building the dependency relationship among the software entities (functional and data elements).

Figure 6:
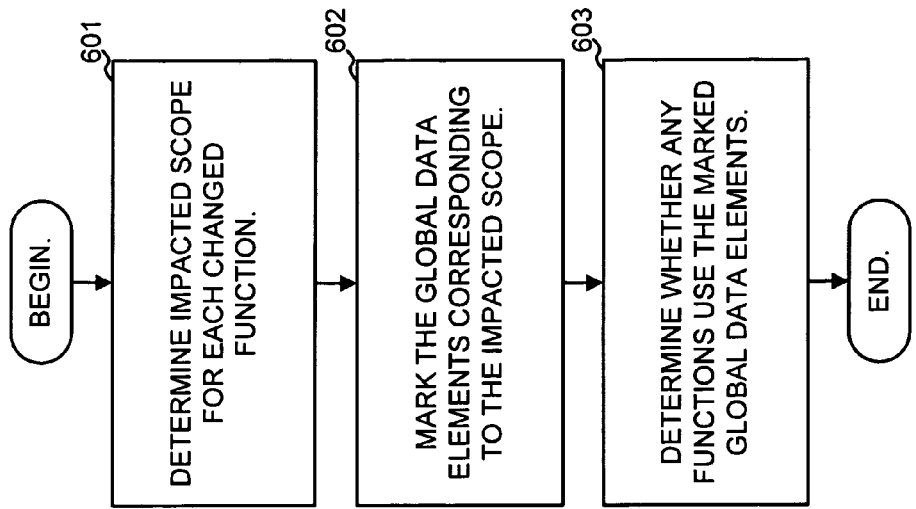
FIG. 6 is a flow chart illustrating, in additional detail, exemplary operations of static analysis logic in determining global data elements corresponding to changed functions.

FIG. 6 is a flow chart illustrating, in additional detail, exemplary operations of static analysis logic 410 in determining the global data elements corresponding to each changed function.

Figure 7:
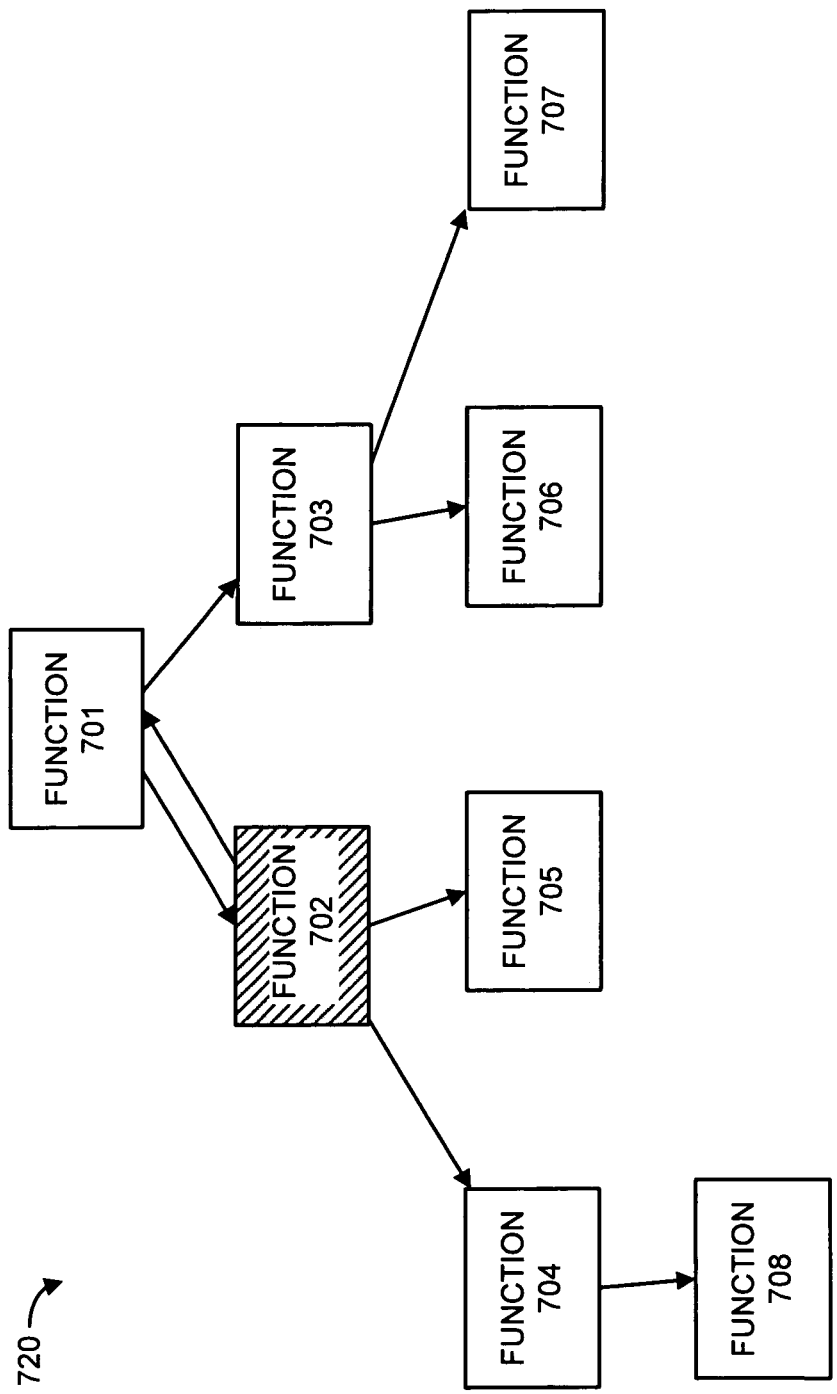
FIG. 7 is a diagram illustrating the concept of determining the impact scope of a changed function.

Static analysis logic 410 may analyze each of the changed functions to determine changes in scope (i.e., the impacted scope) for each changed function (act 601). FIG. 7 is a diagram illustrating the concept of determining impacted scope for a changed function. As shown in FIG. 7, assume that blocks labeled 701-708 are functions and that an arrow from a first function to a second function indicates that the first function calls the second function. For example, function 702 calls functions 704 and 705. In this example, assume that function 702 is the changed function. The impacted scope for function 702 may be defined to include all of the functions directly or indirectly called by function 702. Thus, functions 704, 705, and 708 would all be functions in the impacted scope of function 702, as functions 704 and 705 are called by function 702 and function 708 is called by function 704. In alternative implementations, the analysis shown in FIG. 7 may also be refined to a basic block level granularity, by using, for example, control flow graph and data definition use chains, along with inter-function call graph information.

The impacted scope may additionally be defined to include all the functions that call the changed function and that receive a return value. Still further, for any such calling function, these same rules may be applied to potentially expand the impacted scope. Applying these rules to the example of FIG. 7, assume that function 701 calls function 702 and receives a return value. Function 701 would thus also be in the impacted scope of function 702. A impacted scope analysis may then be applied to function 701, resulting in functions 703, 706, and 707 also being included in the impacted scope of function 702. The impacted scope of function 702 thus includes functions 701-708 in this example, which is labeled as impacted scope 720. By using an inter-function global call graph dependency chain, the basic block level dependency may be derived to identify the impacted basic blocks for the changed basic blocks in conjunction with the control flow graph and definition use chains.

Figure 8:
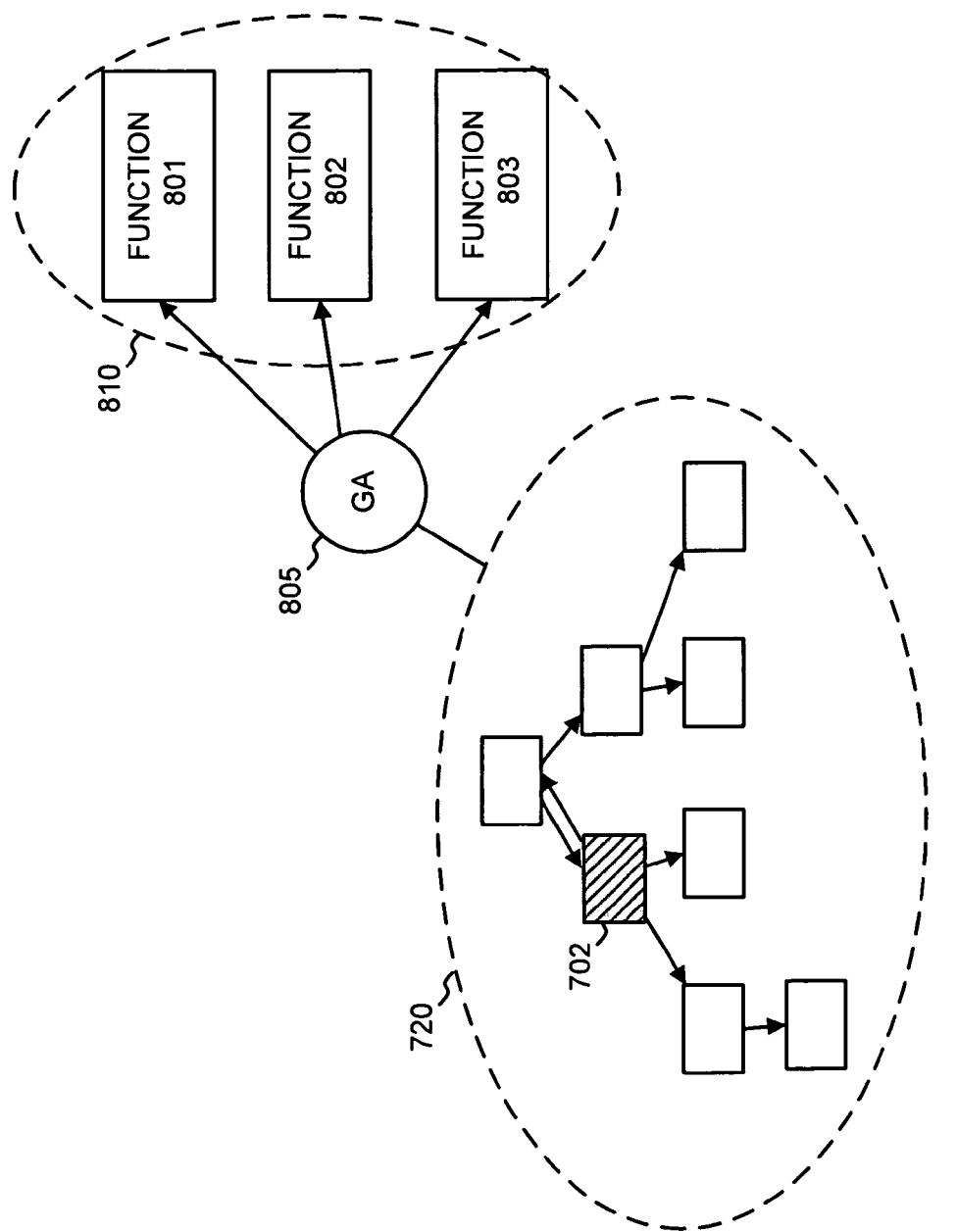
FIG. 8 is a diagram conceptually illustrating exemplary functions and global data elements in a software project.

Static analysis logic 410 may mark the global data elements corresponding to the impacted scope (act 602). FIG. 8 is a diagram conceptually illustrating exemplary functions and global data elements in a software project. Assume that impacted scope 820 is being examined. Further, assume that global data element 805 is modified by one or more functions in impacted scope 720. Static analysis logic 410 may additionally determine whether any additional function uses the marked global data element 805 (act 603). Assume that functions 801, 802, and 803 are determined as functions that use global data element 905.

In act 602 (FIG. 6), global data elements were described as being marked when modified by a function within a determined impacted scope. Techniques for determining when a global data element is modified will next be described. A global data element can be defined as a data structure variable with a persistent memory location, which is accessible for the software process or system, directly or indirectly through aliasing. The global data elements may also include dynamic data elements allocated from the heap space, which are not persistent through out the life of the system, but are visible through aliasing for the whole system, and have global behavior impact for the software system.

Global variables that are directly assigned with value of another local scope variable, a function argument scope variable, or a global scope variable may be marked as being modified. As an example of this, consider the statement ga=lb, which indicates that variable ga, a global variable, takes the value of variable lb, a local variable. This is a direct assignment to global variable ga, and ga would therefore be marked as being modified.

Assignments to global variables may, however, also be indirect assignments that are performed through pointer aliasing. For example, consider an alias subfield assignment such as an assignment of the form:

{la=ga; lb=gb; la→fb=lb}.

Figure 9:
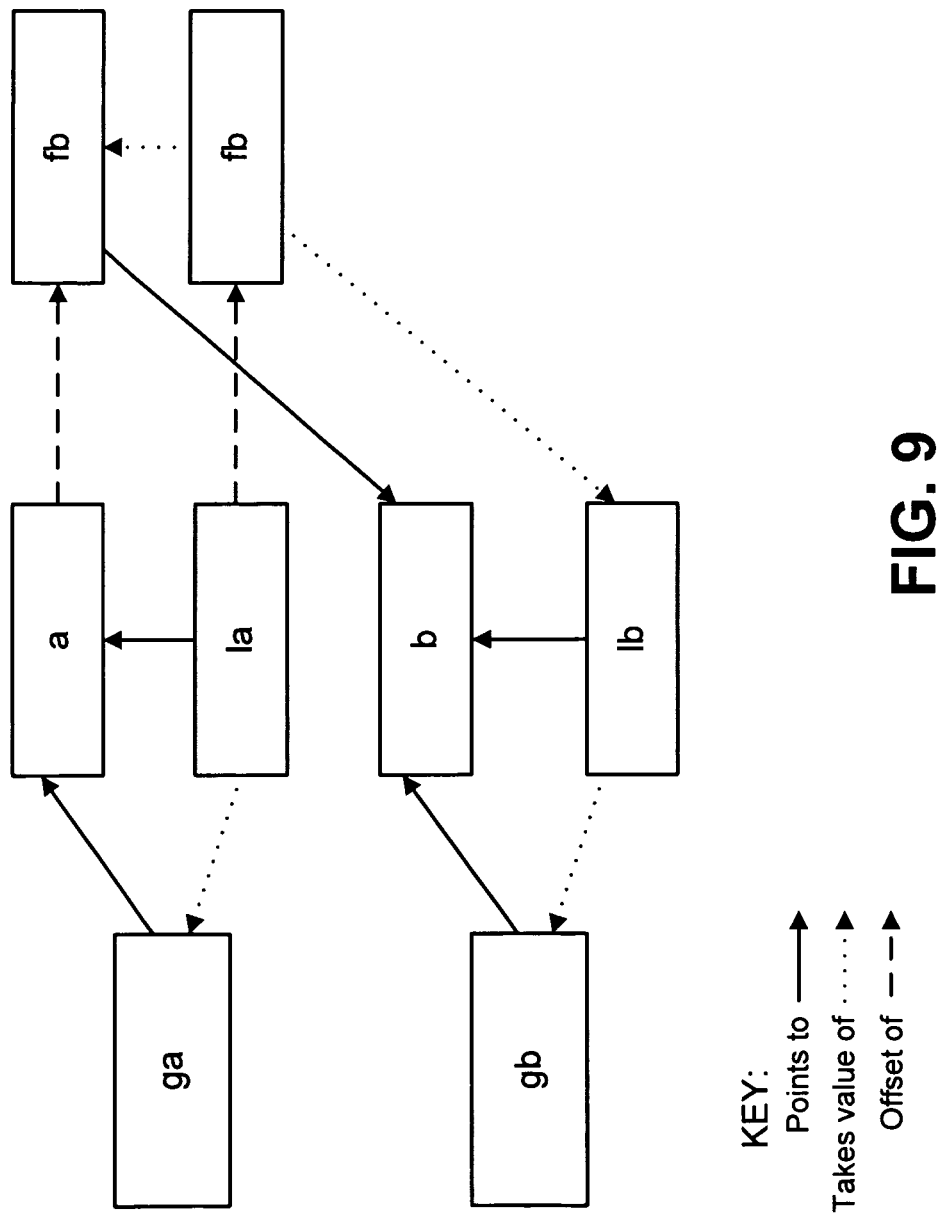
FIGS. 9 and 10 are diagrams illustrating global variable assignment based on indirect assignment through pointer aliasing.

This alias subfield assignment is graphically illustrated in FIG. 9. Here, local variable la takes the value of global variable ga and local variable lb takes the value of global variable gb. Assume that ga and gb are pointers to addresses of global variables a and b, respectively. In this situation, local variable la and local variable lb would also now point to a and b, respectively. Also, in this example, assume fb field offset of value of la takes the value of lb. In other words, the fb field offset of global variable a takes the value of address of global variable b. Global data elements fb field offset of global structure variable a and global variable b are thus inter-dependent. Here the global data usage and dependency information can be deduced as follows:
a.b <takes the value of> address of b,
a.b <modified>, b <used>

As another example of assignments to global variables that are indirect assignments performed through pointer aliasing, consider an alias value assignment of the form:

{la=ga; lb=gb; *la=lb}.

Figure 10:
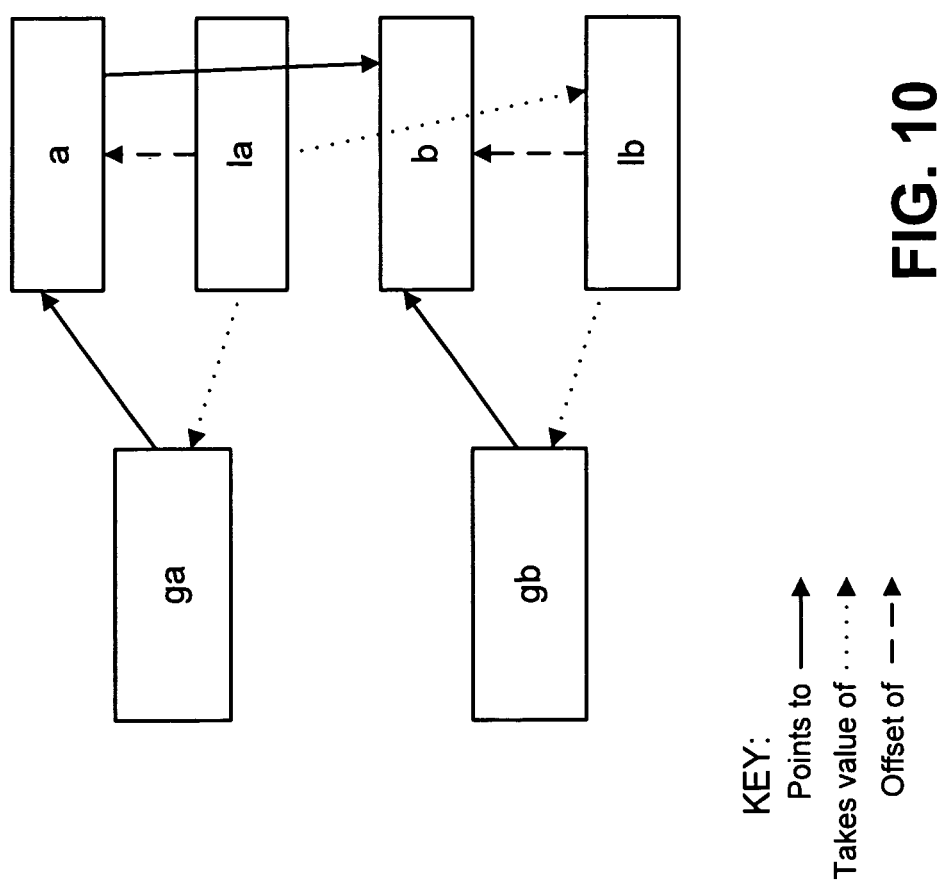

This alias assignment is graphically illustrated in FIG. 10. Here, local variable la takes the value of global variable ga and local variable lb takes the value of global variable gb. Assume that ga and gb are pointers to addresses of global variables a and b, respectively. In this situation, local variable la and local variable lb would also now point to a and b, respectively. Also, the value of local variable la takes the value of local variable lb. This means that the value of global variable ga takes the value of global variable gb. Here the global data usage and dependency information can be deduced as follows:
a <takes the value of> b, a <modified>, b <used>.

In analyzing the source code to determine the dependency of global data variables, the dependency of a global variable and its sub-fields can be deduced by, for example, assuming that successively offset global variables of the same type have a parent-child relationship. This relationship is called a homogenous set relationship herein. This kind of parent-child relationship may be used to construct complex data structures like trees, lists and other higher order non-linear data structure container constructs, that may be used to store of homogenous data elements in an ordered or non-ordered fashion. Formation of a potentially large number of parent-child relationships in a homogenous set is illustrated by the following section of code.

```
lookup_abc (key_type key)
{
    la=ga;
    while (la) {
    if (la→key==key) break;
    la=la→next;
    }
    return la;
}
```

Here, the local variable la takes the value of the global variable ga and also takes the value of the next field offset of the value of local variable la (which is value of next field offset of value of global variable ga). Supposing ga points to the address of global structure variable a. The local variable la points to both address of a and value of fb field offset of global variable a (a.b). Here the global variable a and a.b have a parent child homogeneous set relationship. This means that the value of global variable a.b can be reduced to address of a. This relationship can be deduced as follows:
a.b <takes the value of> address of a.

Additionally, in the context of alias reduction, when an aliased pointer variable de-references to an actual global data element, the aliased pointer variable may be reduced to a memory location and a named memory location of matching variable type during static analysis. This may be applicable for a data structure container set used for storing a non-homogenous set of data elements.

While executing the static analysis tool for building the data dependency and change impact information, the control path traversal may be expensive. In this case, an aggregate path may be used, which can reduce the computational and space complexity of the static analysis tool without compromising on the accuracy of the desired result.

Function pointers (i.e., variables pointing to addresses of functions) may be invoked through state machines and trigger function mechanisms to perform various functionalities inside the software system, reducing the effective code complexity and computational cycles, with potential gains of more flexibility and portability of the software system. However, for the purpose of static analysis, the system may need to cover all of the call paths possible at the invocation point of the function pointer variables. The worst case scenario may be the invocation of all functions pointed-to by this function pointer.

Consider the example illustrated by the segment of code: {la=(typeof(ta*) (lb−offsetof (typeof (ta), tb));}. Here the variable "la" takes the value of lb—offset of the tb sub-field inside the structure ta. If lb points to ga→b (address of a.b), then la points to the value of ga (address of a, which is of data type ta). This pointer arithmetic may be used to deduce the data structure containers from their field addresses. This is one type of pointer coercion. If it is known that lb points to the global structure field a.b, it can be determined that lb points to the address of a.

Consider the example shown by the following code segment: {la=ga; lb=la; fn (lb→fc); return lb→fd;}. On traversing this expression, the following dependency relationships can be deduced: la takes the value of ga (&a), lb takes the value of la(&a), lb→fc (ga→fc, a.fc) is the effective function argument for the function fn, and lb→fd, (ga→fd, a.fd) is the effective return value. The motivation for this intra function data dependency chain construction is to build the global data dependency relationship at various call points inside functions for the static analysis.

Figure 11:
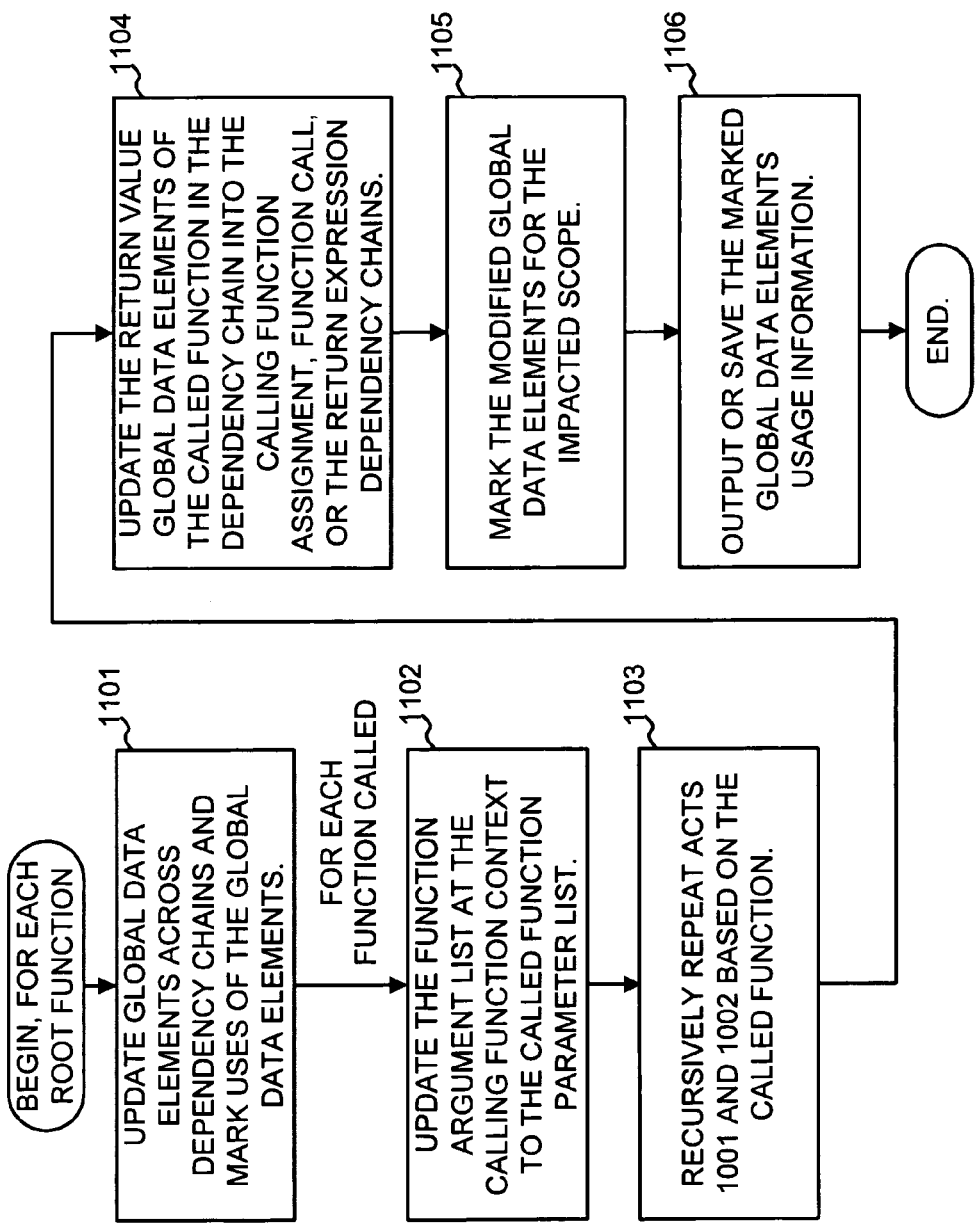
FIG. 11 is a flow chart illustrating exemplary operations for determining usage analysis and making a changed score determination for global data elements.

Global data flow dependency chains may be implemented based on the techniques described above. FIG. 11 is a flow chart illustrating exemplary operations using these techniques for determining global data elements in the impacted scope of a modified function.

To begin, for each function, global data elements across dependency chains may be updated to mark the uses of global data elements (act 1101). For example, as described above, function control paths may be traversed to find parent-child relationships.

For each called function, the function argument list at the calling function context may be updated to the called function parameter list (act 1102). Acts 1101 and 1102 may be repeated recursively for each called function (act 1103).

The returned value global data elements of the called function in the dependency chain may be updated into the calling function assignment, function call, or the return expression dependency chains (act 1104). Based on this, the global data elements modified by the code corresponding to the impacted scope may be marked (act 1105). The marked global data elements usage information may then be saved or output to a user (act 1106). The usage information may correspond to the functions that are in the impacted scope of a changed function.

CONCLUSION

The static analysis portion of selective regression testing was particularly described above to determine the mapping of global data elements usage to functions of the software system and to determine the impacted scope for a change in a source code base.

Regression testing techniques were described in which a limited and safe set of regression test units is determined through the static analysis of a source code based to determine, among other things, a mapping of global data elements to functions of the software system that may modify the global data elements. The static analysis described above, however, may potentially be used for other class of static analysis applications in addition to selective regression testing.

For example, while a series of acts have been described with regard to FIGS. 5 and 6, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of network topologies, software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
   storing, by a device, one or more changes to source code that defines functions and global data elements of a software project;
   performing, by the device, a static analysis of the source code to determine functions in the source code and global data elements in the source code that correspond to one or more changed functions of the source code, performing the static analysis including:
   analyzing a set of the one or more changed functions to determine a respective impacted scope of the one or more changed functions in the set of the one or more changed functions;
   determining, based on analyzing the set of the one or more changed functions, at least one of the functions that is called by a respective changed function of the one or more changed functions;
   marking one or more global data elements that correspond to the respective impacted scope of the one or more changed functions in the set of the one or more changed functions; and
   determining whether one or more other functions read data from the marked one or more global data elements,
   the one or more other functions being different than the functions, and
   the one or more other functions not being directly called by the functions; and
   executing, by the device, a test of the software project using a set of test units determined based on performing the static analysis.

2. The method of claim 1, further comprising:
enforcing a uniform naming scheme for the global data elements,
where variable types are named using predetermined expressions to identify the global data elements of the software project.

3. The method of claim 1, where performing the static analysis of the source code further includes:
determining an impacted scope associated with a changed function, of the one or more changed functions, based on one or more functions that are called by the changed function.

4. The method of claim 3, where determining the impacted scope associated with the changed function further includes:
defining functions in the impacted scope associated with the changed function that call the changed function; and
defining functions in the impacted scope associated with the changed function that receive a return value.

5. The method of claim 1, where determining whether the one or more other functions read data from the marked one or more global data elements includes:
traversing one or more function control paths to find parent-child relationships between global variables.

6. The method of claim 1, where marking the one or more global data elements includes:
determining that the one or more global data elements are considered modified when a data element in the impacted scope is directly assigned to the global data element.

7. The method of claim 1, where marking the one or more global data elements includes:
determining that the one or more global data elements are considered modified when a local variable in the impacted scope is indirectly assigned through pointer aliasing to the global data elements.

8. A device comprising:
a processor to:
store one or more changes to source code that includes functions and global data elements of a software project;
perform a static analysis of the source code to determine functions in the source code and global data elements in the source code that correspond to one or more changed functions of the source code,
the processor, when the performing the static analysis, being further to:
analyze a set of the one or more changed functions to determine a respective impacted scope of the one or more changed functions in the set of the one or more changed functions;
determine, based on analyzing the set of the one or more changed functions, at least one of the functions that is called by a respective changed function of the one or more changed functions;
mark one or more global data elements that correspond to the respective impacted scope of the one or more changed functions in the set of the one or more changed functions; and
determine whether one or more other functions read data from the marked one or more global data elements,
the one or more other functions being different than the functions, and
the one or more other functions not being directly called by the functions; and
execute a test of the software project using a set of test units determined based on the static analysis of the source code.

9. The device of claim 8, where, when performing the static analysis, the processor is further to:
determine an impacted scope for a changed function based on one or more functions that are called by the changed function.

10. The device of claim 9, where, when performing the static analysis, the processor is further to:
determine whether the global data elements are modified by the impacted scope when a data variable in the impacted scope is directly assigned to a global data element.

11. The device of claim 9, where, when performing the static analysis, the processor is further to:
determine whether the global data elements are modified in the impacted scope when a local variable in the impacted scope is indirectly assigned through pointer aliasing.

12. A method comprising:
storing, by a device, one or more changes to source code that defines functions and global data elements of a software project, the source code implementing a uniform naming scheme for the global data elements;
performing, by the device, a static analysis of the source code to determine which global data elements in the source code correspond to one or more changed functions of the source code, performing the static analysis including:
determining an impacted scope for a set of the one or more changed functions based on one or more functions that are called by the one or more changed functions and one or more functions that call the one or more changed functions and receive a return value from the one or more changed functions;
marking one or more global data elements that correspond to the impacted scope of the one or more changed functions in the set of the one or more changed functions; and
determining whether one or more other functions read data from the marked one or more global data elements,
the one or more other functions being different than the functions, and
the one or more other functions not being directly called by the functions; and
performing, by the device and based on the static analysis, a task.

13. The method of claim 12, further comprising:
executing a test of the software project using test units determined based on the static analysis of the source code.

14. The method of claim 12, where determining the impacted scope further includes:
designating one or more functions as being in the impacted scope that are directly or indirectly called by the one or more changed functions; and
designating one or more functions as being in the impacted scope that call the one or more changed functions and that receive a return value from the one or more changed functions.

15. The method of claim 13, where executing the test further comprises:
generating a set of test units to use for the test as a set of test units that define a particular set of test units based on the one or more changed functions determined by the static analysis; and
running the test units to execute the test.

16. A non-transitory computer-readable medium containing instruction, the instructions comprising:
one or more instructions which, when executed by at least one processor, cause the at least one processor to:

store one or more changes to source code that includes functions and global data elements of a software project;

perform a static analysis of the source code to determine functions in the source code and global data elements in the source code that correspond to one or more changed functions of the source code, the one or more instructions to perform the static analysis including one or more instructions to:

analyze a set of the one or more changed functions to determine a respective impacted scope of the one or more changed functions in the set of the one or more changed functions;

determine, based on analyzing the set of the one or more changed functions, at least one of the functions that is called by a respective changed function of the one or more changed functions;

mark one or more global data elements that correspond to the respective impacted scope of the one or more changed functions in the set of the one or more changed functions; and determine whether one or more other functions read data from the marked one or more global data elements, the one or more other functions being different than the functions, and the one or more other functions not being directly called by the functions; and execute a regression test of the software project using a set of test units determined based on the static analysis of the source code.

17. The medium of claim 16, further comprising:
one or more instructions to determine an impacted scope for a changed function based on one or more functions that are called by the changed function of the software project.

18. The medium of claim 17, further comprising:
one or more instructions to determine whether the global data elements are modified by the impacted scope for the changed function when a data variable in the impacted scope for the changed function is directly assigned to a global data element; and one or more instructions to determine whether the global data elements are modified in the impacted scope for the changed function when a local variable in the impacted scope for the changed function is indirectly assigned through pointer aliasing.

19. The device of claim 9, where, when determining the impacted scope associated with the changed function, the processor is further to:
define functions in the impacted scope associated with the changed function that call the changed function; and define functions in the impacted scope associated with the changed function that receive a return value.

20. The medium of claim 17, where the one or more instructions to determine the impacted scope for the changed function include:
one or more instructions to define functions in the impacted scope for the changed function that call the changed function; and one or more instructions to define functions in the impacted scope for the changed function that receive a return value.

* * * * *